United States Patent [19]

Kramer et al.

[11] Patent Number: 4,955,293
[45] Date of Patent: Sep. 11, 1990

[54] SLIDER

[75] Inventors: Rolf Kramer, Siegen; Alfred Lohmann, Siegen-Eisern; Guido Bieker, Kirchhundem; Herbert Badenbender, Netphen, all of Fed. Rep. of Germany

[73] Assignee: Waggon Union GmbH, Siegen, Fed. Rep. of Germany

[21] Appl. No.: 317,675

[22] Filed: Mar. 1, 1989

[30] Foreign Application Priority Data

Mar. 8, 1988 [DE] Fed. Rep. of Germany ....... 3807547

[51] Int. Cl.$^5$ .............................................. B61F 5/14
[52] U.S. Cl. .................................. 105/199.3; 105/171
[58] Field of Search ............ 105/185, 186, 193, 198.2, 105/199.4, 201, 193, 198.5, 197.5, 197.1, 189, 198.4, 199.3, 204, 208.2, 225, 171, 199.1, 199.2; 188/381, 119; 267/199, 214, 196, 201

[56] References Cited

U.S. PATENT DOCUMENTS

| | | | |
|---|---|---|---|
| 953,681 | 4/1910 | Barber | 105/201 |
| 1,907,505 | 5/1933 | Clasen | 105/186 |
| 1,916,149 | 6/1933 | Hedgcock | 105/186 |
| 1,936,645 | 11/1933 | Shafer | 105/186 |

FOREIGN PATENT DOCUMENTS 0735470  5/1980  U.S.S.R. ........................... 105/199.3

Primary Examiner—Robert P. Olszewski
Assistant Examiner—Mark T. Le
Attorney, Agent, or Firm—McGlew & Tuttle

[57] ABSTRACT

The invention relates to a slider (1) for track vehicles which allows for horizontal relative movements in the longitudinal as well as in the latitudinal direction between the superstructure, such as a freight car body or another vehicle body, and the running gear or between running gear parts. The invention has the task of retaining the effect of the friction in a slider of the described kind in one horizontal direction while eliminating it in the other direction. This problem is solved by mounting the slider on coupling elements, which allow for a nearly unrestricted sliding of the slider within a certain range in one of the two horizontal directions (longitudinally or latitudinally) and which fix the slider rigidly in the other one of the two horizontal directions. The coupling elements are rolling bearings or friction bearings arranged between the slider and the spring or they comprise an upper and a bottom metal cover plate with a middle rubber layer which includes vertically arranged sheet metal strips running parallel and spaced apart and in a straight line.

10 Claims, 2 Drawing Sheets

FIG. 1
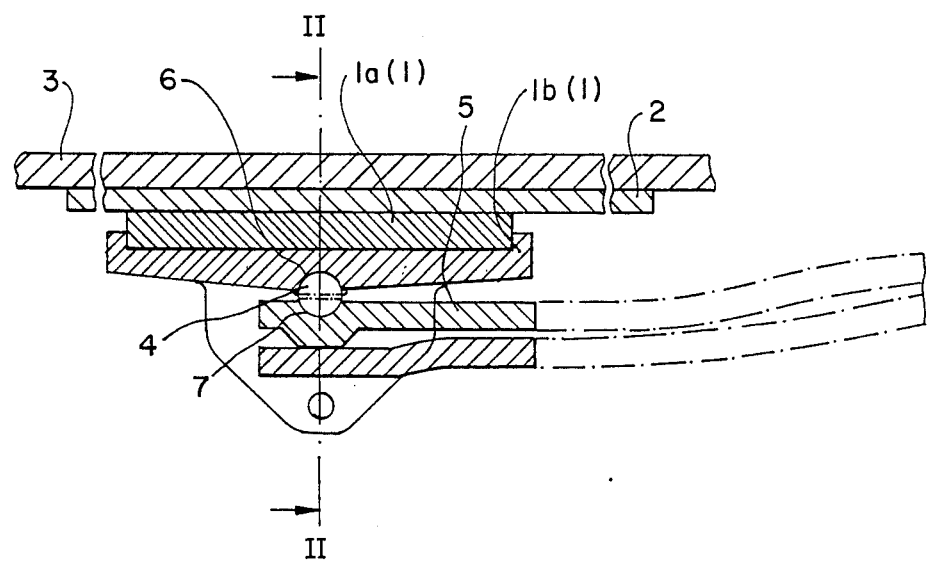
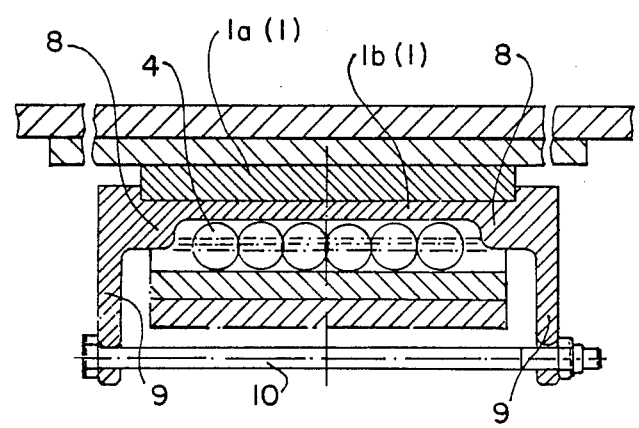
FIG. 2

FIG. 3
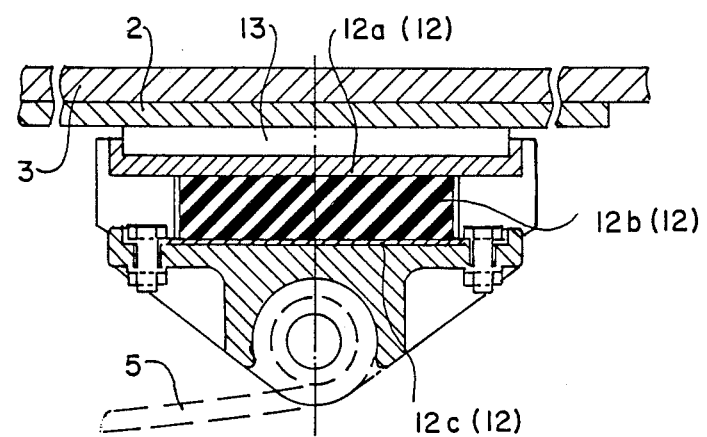
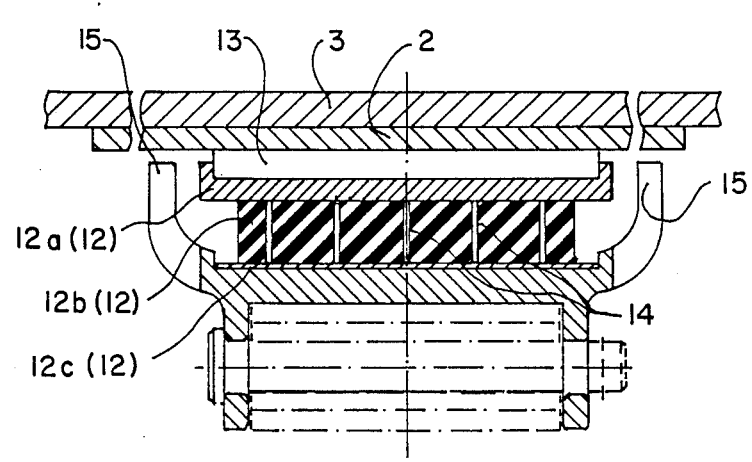
FIG. 4

SLIDER

FIELD OF THE INVENTION

The invention relates to a slider, in particular to a slider for track vehicles which allows for horizontal relative movements in the lengthwise as well as in the lateral directions between a superstructure (such as a freight car body or another vehicle body) and a running gear or between running gear parts. Between the parts moving relative to one another vertically biased springs are arranged and the spring-biased slider dampens the horizontal relative movement by means of a slide plate.

BACKGROUND OF THE INVENTION

In practice it is known that in bogies which are centrically guided by means of a swivel ring, a turntable, a guide journal or by similar means elastic supports are arranged between the superstructure and the bogie [truck] frame which allow for the rotation of the bogie and which allow for dampened relative movements between the superstructure and the bogie by means of interposed, spring-mounted sliders. A relatively even stress is exerted on the wheels by means of the bogie without either straining or unburdening single wheels. The contact pressure of the spring-mounted sliders and therefore the partial unburdening of the guiding means of the bogie can be changed by means of a respective bias of the spring-mounted sliders.

In the known elastic supports there is usually a fixed slide plate provided which supports itself on a spring-mounted slider. In the known versions the spring-mounted slider has spring elements, which allow for a vertical spring deflection of the elastic slider within a certain range. The arrangement of a spring element for vertical deflection of the slider necessitates the arrangement of additional guides, so that the slider is guided exactly during the relative movements between the bogie and the superstructure.

Therefore, the known arrangements of elastic supports are usually very complex. A further disadvantage is that the deflecting sliders have horizontal lengthwise play even when under load. Due to this the desired torsional dampening effect of the lateral sliders is missing, so that the superstructures tend to sway (side motion).

A directly operating rotation dampening between the superstructure and the running gear is known from DE-PS 28 15 375 and DE-OS 28 42 211, in which the known fixed slide plate has a level slide surface and the deflecting slider has a slightly convex slide surface. The deflecting slider is provided with the shape of a leaf spring supported merely at its ends. The leaf spring being mounted without longitudinal play. In these known executions the simultaneous friction of the sliders in lengthwise and lateral direction is a disadvantage. While a certain dampening of the rotating movement of the running gear is desirable to avoid a swaying of the running gear wheel set etc. and, therefore, instability of the superstructure, a soft connection of the superstructure in the lateral direction to the running gear is desired for a better decoupling in order to avoid resonances and therefore a decrease in running quality.

SUMMARY OF THE INVENTION

The invention has the task of finding an opportunity of retaining the effect of the friction in a slider of the described kind in one horizontal direction while eliminating it in the other direction.

This problem is solved in that the friction of the slider on the slide plate is eliminated in one of the two horizontal directions by means of mounting the slider on coupling elements, which allow for an unrestricted or nearly unrestricted sliding of the slider within a certain range in one of the two horizontal directions (lengthwise direction or lateral direction) and which fix the slider rigidly in the other one of the two horizontal directions.

The coupling elements have the shape of rolling bearings or friction bearings which are arranged between the slider and the spring. Herein, slider and spring are either connected directly to one another by means of the coupling elements or connected through bearing parts or structural parts of the running gear.

In this arrangement the slider is advantageously fixed rigidly in one of the horizontal directions (lengthwise direction or lateral direction) and operates directly and without play as a rotation dampener, while in the other direction the slider can slide freely within a certain range, and therefore guarantees an unrestricted soft connection in this direction. The quality of the running properties of the vehicle are increased decisively.

According to an embodiment of the invention the coupling elements are arranged in straight grooves or guides of the slider and the spring or the bearing or the structural elements of the running gear, the grooves or guides coinciding (being congruent) with regard to one another.

Advantageously the grooves or guides of the slider or of its counter bearing (i.e. the spring 5) have limiting means (stoppers) at their ends to restrict the range of movement.

Furthermore it is favorable if the slider is mounted fixedly and with vertical play to its counter bearing (i.e. spring 5) by means of the coupling elements.

In a further embodiment of the invention the coupling elements comprise an upper and a bottom metal cover plate, and vertical sheet metal strips are arranged in the middle rubber layer in straight lines and parallel with regard to one another and spaced apart. The sheet metal strips in the middle rubber layer prevent the two metal cover plates from sliding with regard to one another (longitudinally and latitudinally) and they guarantee a nearly unrestricted sliding of the two cover plates within their range and therefore of the running gear with regard to the superstructure in the other one of the two directions.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the drawings:

FIG. 1 shows a longitudinal section through the slider according to an embodiment of the invention, FIG. 2 shows a section according to line II—II of FIG. 1, FIG. 3 is a longitudinal section through a second embodiment of the invention, FIG. 4 is a cross section through the embodiment according to FIG. 3.

DESCRIPTION OF THE PREFERRED EMBODIMENTS

In the embodiment according to the FIG. 1 and 2 a slide piece 1 includes a friction element 1a and a friction element support 1b. The friction element 1a and the friction element support 1b are positioned under and substantially parallel to a slide plate 2 of the superstructure 3. The slide plate 2 is planer on its sliding surface and is connected fixedly to the superstructure 3. The friction element 1a of the slide piece 1 is also mounted fixedly on the friction element holder 1b of the slide piece 1. The slide piece 1 sits on a spring 5 by means of coupling elements 4 having the shape of ball bearings, said spring being connected to the running gear frame. For the reception of the coupling elements 4 coinciding bearing surface and grooves 6 and 7 are formed in the friction element holder 1b and the spring 5, respectively. The grooves are formed in a straight line and at a right angle with regard to a running gear arrangement (wheel set, gear, transmission arrangement). The groove 6 of the friction element holder 1b is limited at its longitudinal ends by means of limiting means [stoppers] 8, which restrict the freedom of motion of the coupling elements 4 in lateral direction with regard to the running gear. Downwardly extending webs 9 are arranged on sides of the friction element holder 1b and extend over the spring 5. A safety bolt 10 connecting the two webs 9 is arranged below the spring 5 and prevents the unintentional lifting of the slider 1 from the coupling elements 4 and the spring 5.

When the running gear rotates with regard to the superstructure 3, the running gear is dampened in the lengthwise direction of the vehicle with regard to the superstructure without play due to the contact of the spring-biased slider 1 with the friction plate 2 of the superstructure 3 by means of the friction coating 1a. The relative movement in the lateral direction of the vehicle is not restricted. By means of the coupling elements the spring 5 can slide nearly unrestricted in the lateral direction of the vehicle with regard to the slider 1. A strong coupling of the running gear to the superstructure in the lateral direction of the vehicle is avoided. However, once the defined lateral play is used up, a dampening of the lateral movement occurs though the slider 1 and the slide plate 2.

In the embodiment represented in the FIG. 3 and 4 there is also a friction plate 2 arranged fixedly under the superstructure 3. A friction coating 13 fastened on the rubber-metal spring element 12 sits close under the friction plate due to spring-mounting. The rubber-metal spring element 12 is mounted fixedly on running gear parts, a spring or the wheelset itself. The rubber-metal spring element 12 comprises an upper metal cover plate or slider friction element support 12a, a middle rubber layer 12b and a bottom metal cover plate 12c. In the middle rubber layer 12b between the cover plates 12a and 12c vertical straight sheet metal strips 14 are mounted. These metal strips 14 are spaced out with regard to one another and arranged in the lengthwise direction of the vehicle. Lateral limitations 15 restrict the free lateral movement of the two cover plates 12a and 12c with regard to one another.

During the rotation of the running gear with regard to the superstructure the two cover plates 12a and 12c are rigidly connected to one another in the lengthwise direction of the vehicle by means of the sheet metal strips 14. Therefore the rotation of the running gear with regard to the superstructure is dampened directly and without play by means of the friction coating 13 and the slide plate 2. In the lateral direction of the vehicle, in contrast, the upper cover plate 12a with the friction cover 13 can move with regard to the bottom cover plate 12c of the rubber-metal spring element 12 within the lateral rigidity of the middle rubber layer 12b, without at first resulting in a lateral sliding between the friction cover 13 and the slide plate 2. The lateral stability of the middle rubber layer results from the negative pendulum rigidity of the sheet metal and the rubber thrust (shearing load) rigidity.

While specific embodiments of the invention have been shown and described in detail to illustrate the application of the principles of the invention, it will be understood that the invention may be embodied otherwise without departing from such principles.

What is claimed is:

1. A slider arrangement for vehicles, for allowing horizontal lateral and lengthwise movement between a vehicle superstructure and a vehicle wheel set arrangement, comprising:
    a slide plate fixedly connected to the vehicle superstructure;
    a slider friction element fixedly connected to a slider friction element support, said slider friction element having an upper friction sliding surface for engagement with a lower surface of said slide plate; and,
    limited free movement connection means connected to said slider element support and to a spring means, for allowing free movement in a first horizontal direction between a first limit and a second limit and preventing free movement in a second horizontal direction.

2. A slider arrangement according to claim 1, wherein: said limited free movement connection means includes a groove formed in said slider friction element support, said groove having first and second ends defined by stop members and roller bearings bearingly positioned within said groove and bearing on said spring means.

3. A slider according to claim 2, wherein: said spring means includes a groove corresponding to the groove formed in the friction element support.

4. A slider according to claim 1, wherein: said limited free movement connection means includes a rubber layer in contact with a lower surface of said slider friction element support and a bottom metal plate engaging said rubber layer, vertically arranged sheet metal strips being positioned between individual rubber portions of said rubber layer in straight lines, each of said sheets being arranged parallel to one another.

5. A slider arrangement, in particular for track vehicles allowing for horizontal relative movement in longitudinal and in latitudinal directions between a vehicle superstructure and a running gear arrangement, comprising: a slide plate fixedly connected to the vehicle superstructure, a slider friction element fixedly connected to a slider friction element support, said slider friction element having an upper friction sliding surface engaging a lower surface of said slide plate; vertically acting springs connected to the running gear; and, coupling means coupling said vertically acting springs and said slider friction element support and for substantially eliminating friction between the vertically acting springs and the slider friction element support in one of the two horizontal directions, said coupling means including coupling elements which allow nearly unrestricted sliding of the slider friction element support with respect to the running gear in one horizontal direction and which fixes immovably the slider friction element support with respect to the running gear in the other of the two horizontal directions.

6. A slider arrangement according to claim 5, wherein the coupling elements are one of rolling and slide bearings arranged between the slider friction element support and the vertically acting springs.

7. A slider arrangement according to claim 5, wherein the coupling elements are arranged coincidingly with regard to one another and in a straight line in one of grooves and guides formed in the slider friction element support and the vertically acting springs.

8. A slider arrangement according to claim 5, wherein the slider friction support element includes a groove and the vertical acting springs include a guide, said groove and guide having limiting means at their ends.

9. A slider arrangement according to claim 5, wherein the slider friction element support is mounted with vertical play on said vertically acting springs.

10. A slider arrangement according to claim 5, wherein the coupling elements comprises an upper and a bottom metal plate with a middle rubber layer, the middle rubber layer having vertically arranged sheet metal strips which are arranged in a straight line parallel and spaced with regard to one another.

* * * * *